(12) United States Patent
Takahashi

(10) Patent No.: US 6,181,326 B1
(45) Date of Patent: *Jan. 30, 2001

(54) INFORMATION DISPLAY CONTROL UNIT AND THE METHOD AND REMOTE INPUT UNIT AND THE METHOD

(75) Inventor: Naomasa Takahashi, Chiba (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/754,271

(22) Filed: Nov. 20, 1996

(30) Foreign Application Priority Data

Nov. 30, 1995 (JP) .................................................. 7-312149

(51) Int. Cl.⁷ ...................................................... G09G 5/08
(52) U.S. Cl. ............................................. 345/158; 348/10
(58) Field of Search .................................... 345/158, 157, 345/156, 353, 327; 348/10, 734

(56) References Cited

U.S. PATENT DOCUMENTS

| 4,481,508 | * | 11/1984 | Kamei et al. | 340/712 |
| 4,918,723 | * | 4/1990 | Iggulden et al. | 379/100 |
| 5,307,297 | | 4/1994 | Iguchi et al. | 345/169 |
| 5,406,273 | | 4/1995 | Nishida et al. | 345/169 |
| 5,579,496 | | 11/1996 | Van Steenbrugge | 345/158 |
| 5,682,511 | | 10/1997 | Sposato et al. | 345/353 |

* cited by examiner

Primary Examiner—Matthew Luu
(74) Attorney, Agent, or Firm—Jay H. Maioli

(57) ABSTRACT

A remote input unit such as OCR sends a batch of data of an input character string as a remote control signal, a set-top box (STB) receives the signal and decodes it to the data of the original character string. After STB stores the data of the character string, it instructs a television set to display the data. STB accesses to a terminal corresponding to URL of the character string in the Internet via a telephone line.

9 Claims, 18 Drawing Sheets

FIG. 15A
FIG. 15B
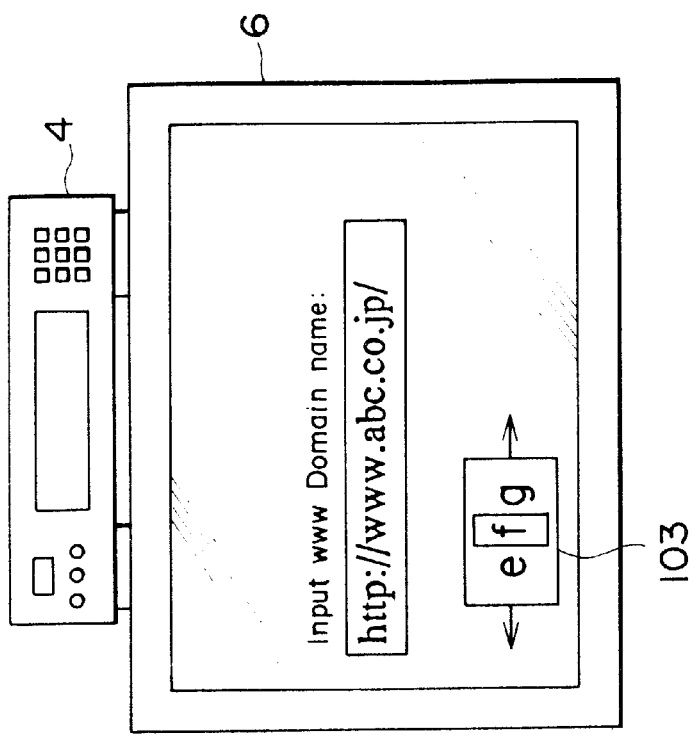
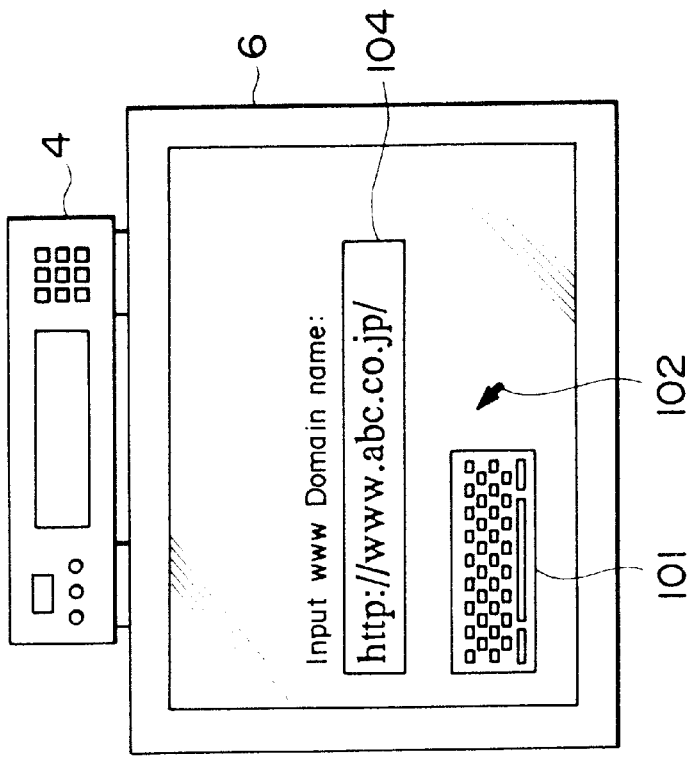

INFORMATION DISPLAY CONTROL UNIT AND THE METHOD AND REMOTE INPUT UNIT AND THE METHOD

FIELD OF THE INVENTION

The present invention relates to an information display control unit and the method, and a remote input unit and the method, particularly relates to a remote input unit for transmitting a batch of input character string data and the method, and an information display control unit for receiving the character string data and accessing to a terminal which is provided with the character string as an address and is connected to a computer network and the method.

BACKGROUND OF THE INVENTION

Recently, a computer network is being popularized and above all, the Internet on a world scale attracts notice. Services in the Internet are received by a terminal constituted by a computer 93 connected to the Internet mainly as shown in FIG. 14.

Each terminal in the Internet is provided with its proper internet protocol (IP) address and if each terminal accesses to another terminal and communicates with it, the location of the terminal in a computer network is specified based upon this IP address and processing for access and communication is performed. This IP address is expressed in the shape that a dot is put between four numbers as 128.1.2.3.

In World Wide Web (WWW) as an information retrieval system (service) utilizing the Internet, a variety of information can be accessed via Uniform Resource Locator (URL). This URL is expressed by a character string such as "http://www.abc.co.jp." "http" in it shows a protocol name and "www.abc.co.jp" shows the name of a host (server) (a domain name). The name of a host (a domain name) is converted to its IP address by Domain Name System (DNS) set in relation to the Internet.

If a terminal is constituted by a computer 93 as shown in FIG. 14, its user inputs an IP address and a URL character string via his/her keyboard 91 and mouse 92, checking them on his/her display 94.

At present, such a terminal is mainly used to receive a computer network service, however, it is conceivable that in future a computer network service can be received by controlling a television set by an information display control unit such as a set-top box (STB).

For example, as shown in FIGS. 15A and 15B, STB 4 provided with a modem can communicate data with another terminal (server) by connecting it to a television set 6 and connecting it to the Internet via a telephone line.

As a variety of operations are more often performed on such a television set 6 by remote control using a remote controller and others than they are performed nearby a unit as a terminal shown in FIG. 14, it is conceivable that such a unit on which operations by remote control is enabled in addition to conventional operations is used even if an IP address and a character string such as URL are input.

For example, it is conceivable that a character string is input using a remote controller shown in FIGS. 16 to 19, a wireless keyboard shown in FIG. 20 and a wireless tablet shown in FIG. 21.

Referring to a remote controller shown in FIG. 16, twenty-six alphabetic letters are allocated to three split functional buttons 121. When a user presses the side of "+" or "−" of each button, the signal is sent to STB 4 shown in FIG. 15A or 15B. STB 4 generates a video signal based upon the signal, instructs to display alphabetic letters, for example in a window 103 on the screen of a television set 6 shown in FIG. 15B and changes them to other ones. A user performs the selective input of an alphabetic letter by pressing a predetermined button when a predetermined alphabetic letter is displayed.

A remote controller shown in FIG. 17 is provided with a cursor button 122 and when a user operates this cursor button 122, the signal is sent to STB 4 shown in FIG. 15A or 15B. STB 4 instructs to display a cursor 102 on the screen of a television set 6 as shown in FIG. 15A and moves the cursor according to the signal.

Therefore, a user operates the cursor button 122 to move the cursor 102 to the position of a predetermined alphabetic key in a keyboard 101 displayed on the screen and inputs the alphabetic letter selectively by pressing a definition button 123.

Or as shown in FIG. 15B, alphabetic letters displayed in the window 103 can be changed by displaying predetermined alphabetic letters in the window 103 and operating the right button 122-1 and the left button 122-2 of the cursor button and selective input can be performed by pressing the definition button 123 when a predetermined alphabetic letter is displayed in the center of the window 103.

A remote controller shown in FIG. 18 is provided with a track ball 124 and when a user operates a track ball 124, the signal is sent to STB 4 shown in FIG. 15A or 15B. STB 4 instructs a television set 6 to display a cursor 102 and moves the cursor according to the signal.

As described above, a user moves the cursor 102 to the position of a predetermined alphabetic key in the keyboard 101 displayed on the screen as shown in FIG. 15A by operating the track ball 124 and selectively inputs the alphabetic letter by pressing the definition button 125.

Or as shown in FIG. 15B, a user instructs to display a predetermined number of alphabetic letters in the window 103, changes alphabetic letters displayed in the window 103 by moving the track ball 124 left and right and can input a predetermined alphabetic letter by pressing the definition button 125 when the above letter is displayed in the center of the window 103.

A remote controller shown in FIG. 19 is provided with a tablet 126. When a user writes a letter on this tablet 126, the written letter (the handwritten letter) is sent to STB 4 after it is converted to the corresponding character data and is displayed in a predetermined window 104 on the television set 6.

A wireless keyboard shown in FIG. 20 sends character data corresponding to a key pressed by a user to STB 4 and STB 4 instructs a television set 6 to display the letter in a predetermined window 104 on the television set 6.

Referring to a wireless tablet shown in FIG. 21, when a user writes a letter on the tablet, the written letter (the handwritten letter) is sent to STB 4 after it is converted to the corresponding character code and is displayed in a predetermined window on a television set 6.

As described above, if a character string such as an IP address and URL required for a computer network service is input to an information display control unit such as STB, it is conceivable that a letter is input in order using a remote controller, a wireless keyboard or a wireless tablet, checking an input letter on the screen of a television set 6 on the receiving side.

However, as a character string is required to be input, always checking an input letter on the screen of the receiving side if such a remote controller, wireless keyboard or wireless tablet is used, it is difficult to check a character string on the screen depending upon the size and the quality of the screen of the receiving side and it is impossible to input a character string in a position distant from the screen of the receiving side. Further, there is a problem that if a wireless keyboard is used, operability is bad because speed for sending and processing to display a letter corresponding to a pressed key on the screen is slower than speed at which a user presses a key.

SUMMARY OF THE INVENTION

The present invention is made to solve such problems and the object is to enable sending a batch of input character string data on the sending side, receiving the character string data on the receiving side, accessing to and communicating with a terminal which is connected to a computer network and is provided with the character string as its address.

An information display control unit according to a first aspect of the present invention comprises receiving means for receiving a batch of remote control signals including predetermined character string data as an address in a computer network, conversion means for converting a remote control signal to character string data and outputting it on a display, a terminal connected to the computer network, communication means for communicating via the computer network and control means for controlling the communication means so that the communication means communicates with the terminal corresponding to data converted by the conversion means.

In information display control method according to a second aspect of the invention, a batch of remote control signals including predetermined character string data as an address in a computer network is received, the remote control signal is converted to character string data and displayed on a display, and communication with a terminal corresponding to the character string is performed via the computer network.

A remote input unit according to a third aspect of the invention comprises input means which is operated when a predetermined character string is input, display means for displaying the character string input via the input means and sending means for sending a batch of input character string data.

In remote input method according to a fourth aspect of the invention, predetermined character data is generated corresponding to an predetermined operation for input, a character string consisting of generated letters is displayed and a batch of character string data is sent when an operation for confirmation is executed.

A remote input unit according to a fifth aspect of the invention comprises batch input means which is operated when a predetermined character string is input for inputting all the characters in the character string by one operation and sending means for sending a batch of input character string data.

In remote input method according to a sixth aspect of the invention, predetermined character string data is generated by one operation for input and a batch of the character string data is sent.

As described above, according to the information display control unit of the first aspect and the information display control method of the first aspect, as the information display control unit of the second aspect reads a batch of remote control signals including the data of a predetermined character string, converts this remote control signal to the data of the character string and communicates with a terminal provided with the character string as its address in a computer network, a character string can be also simply and securely input in a location far from a display, and a television set and others can be readily used as a display.

According to the remote input unit of the third aspect and the remote input method of the fourth aspect, as the remote input unit sends a batch of input character strings after it displays the input character strings to be confirmed by a user, the user does not have to input a character string, confirming it on the screen of the receiving side and a character string can be also readily input in a location far from the unit of the receiving side.

According to the remote input unit of the fifth aspect and the remote input method of the sixth aspect, as the remote input unit generates the data of a predetermined character string and sends a batch of data by one input operation, a plurality of character strings can be promptly and securely input and a character string can be also readily input in a location far from the unit of the receiving side.

BRIEF DESCRIPTION OF THE DRAWINGS

FIGS. 15A and 15B show an example in which a character string is input by a conventional remote input unit;

DETAILED DESCRIPTION OF THE PREFERRED EMBODIMENTS

Figure 1:
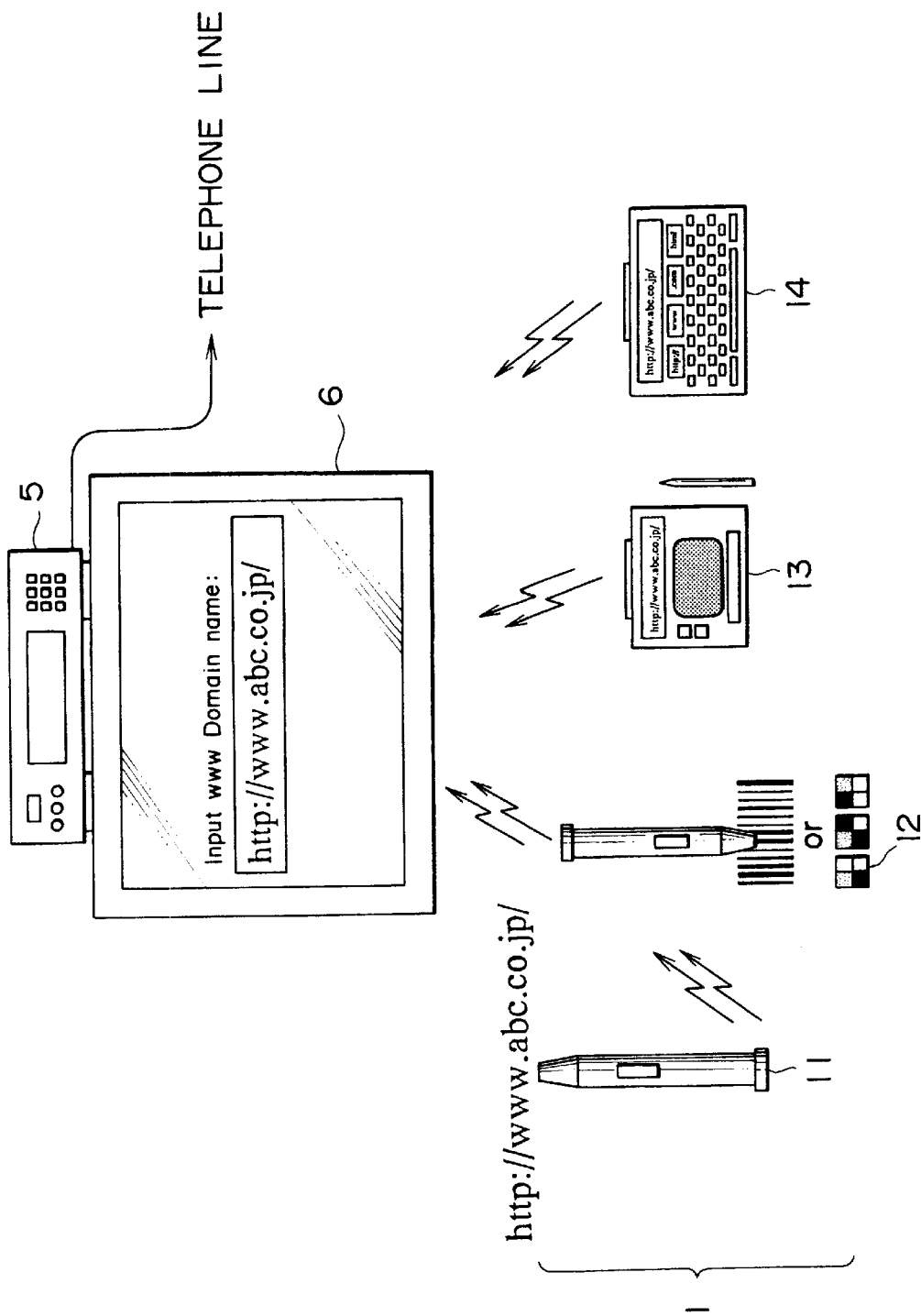
FIG. 1 shows the constitution of an embodiment of an information display control unit according to the present invention.

FIG. 1 shows the working condition of a set-top box (STB) 5 to which an information display control unit according to the present invention is applied. This STB 5 is set so that it receives a remote control signal consisting of infrared radiation or a radio wave from a remote input unit 1 such as an optical character reader (OCR) 11, a bar code reader 12, a handwriting input remote controller 13 and a keyboard input remote controller 14.

OCR 11 is designed so that it irradiates light on a character string (URL) in writing, detects the reflected light, converts character data corresponding to URL to communication data after the detected signal is converted to the character data and sends a batch of the communication data to STB 5. The above URL may be printed and may be handwritten.

The bar code reader 12 is designed so that it irradiates light on a variety of codes such as a bar code corresponding to predetermined URL and a predetermined graphic pattern, detects the reflected light, converts character data corresponding to URL to communication data after the detected signal is converted to the corresponding character data-and sends a batch of the communication data to STB 5. These codes may be printed and may be handwritten.

The handwriting input remote controller 13 is designed so that it recognizes handwritten URL as a character, displays it, further converts character data to communication data after the URL is converted to the corresponding character data and sends it to STB 5.

The keyboard input remote controller 14 is designed so that it displays URL input from a keyboard, converts character data corresponding to the URL to communication data and sends it to STB 5.

STB 5 is designed so that it receives the communication data sent from the remote input unit 1, converts the communication data to character data corresponding to predetermined URL, generates the video signal, outputs it to a television set 6 and instructs to display it and further, accesses another terminal corresponding to the URL (address) via a telephone line and further, the Internet.

Figure 2:
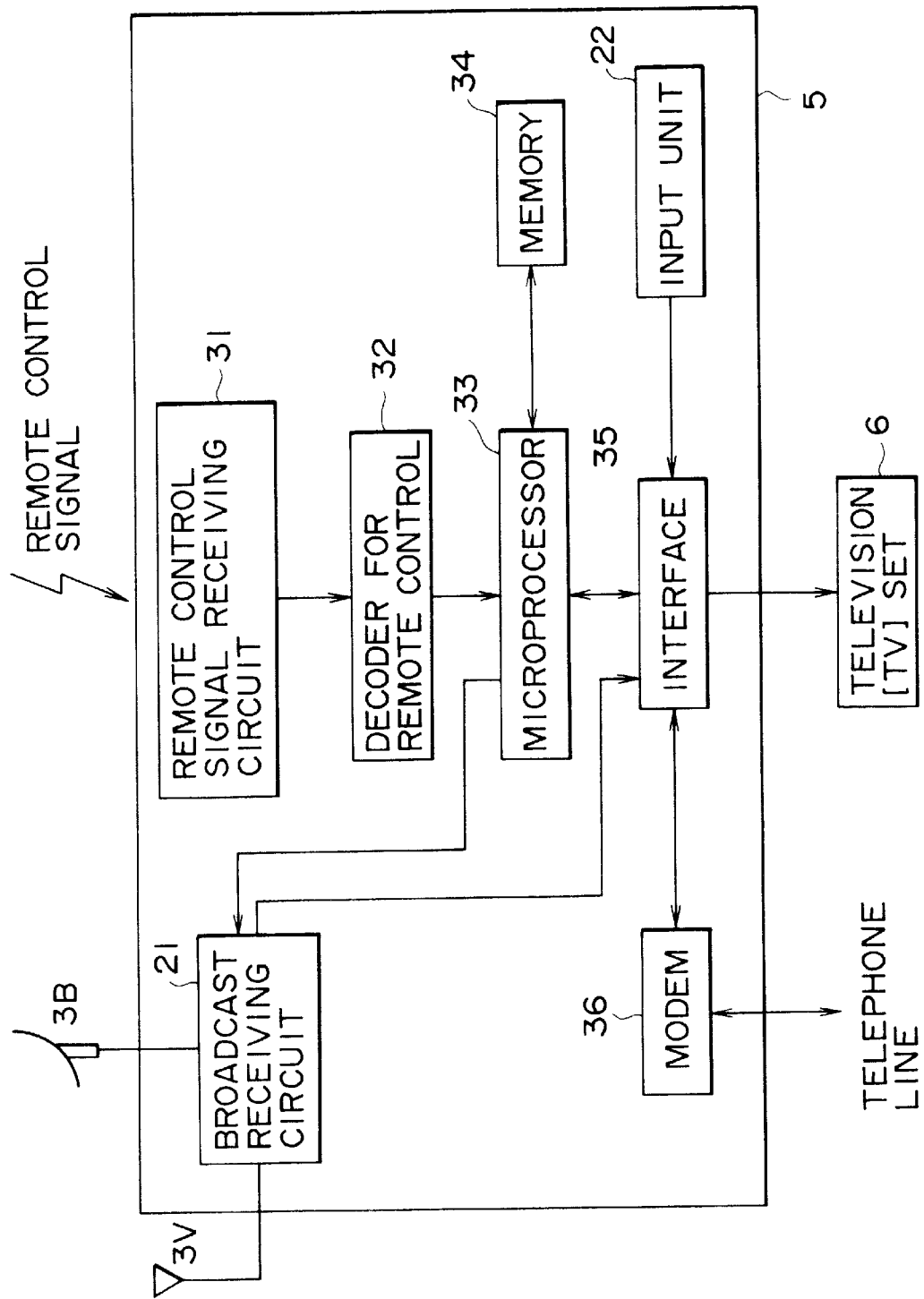
FIG. 2 is a block diagram showing the constitution of the inside according to the embodiment shown in FIG. 1.

FIG. 2 shows the constitution of the inside of STB 5. In this embodiment, STB 5 is designed so that it receives a digital signal of direct broadcasting by satellite with a broadcast receiving circuit 21 via an antenna 3B or receives television broadcasting consisting of ground waves via the antenna 3B, outputs a video signal and a sound signal in the received broadcast to the television set 6 via an interface 35 and instructs to display them.

In STB 5, a remote control signal receiving circuit 31 (receiving means) is designed so that it receives a remote control signal sent from the remote input unit 1 such as the above OCR, 11, the bar code reader 12, the handwriting input remote controller 13 and the keyboard input remote controller 14 and outputs the remote control signal to a decoder 32 for remote control (conversion means).

The decoder 32 for remote control is designed so that it decodes the supplied remote control signal to the corresponding character data and outputs it to a microprocessor 33 (control means).

A modem 36 (communication means) is designed so that it is connected to the Internet as a wide area network for computers via a telephone line and sends or receives data to/from another terminal (server) connected to the Internet according to an instruction by the microprocessor 33 via an interspace 35.

An input unit 22 is designed so that it is operated, for example when a channel of broadcasting to be received is selected and outputs a signal corresponding to the operation to the microprocessor 33 via the interface 35.

The microprocessor 33 is designed so that it executes a variety of processing, for example it controls the broadcast receiving circuit 21 based upon a signal supplied from the input unit 22 via the interface 35. The microprocessor 33 is designed so that it controls the modem 36 via the interface 35 and instructs the modem to access another terminal connected to the Internet via a telephone line.

The microprocessor 33 is designed so that it stores character data supplied from the decoder 32 for remote control in memory 34, outputs the character data to the television set 6 via the interface 35 and instructs to display it. The memory 34 is designed so that it temporarily stores data when the microprocessor 33 executes a variety of processing.

Figure 3:
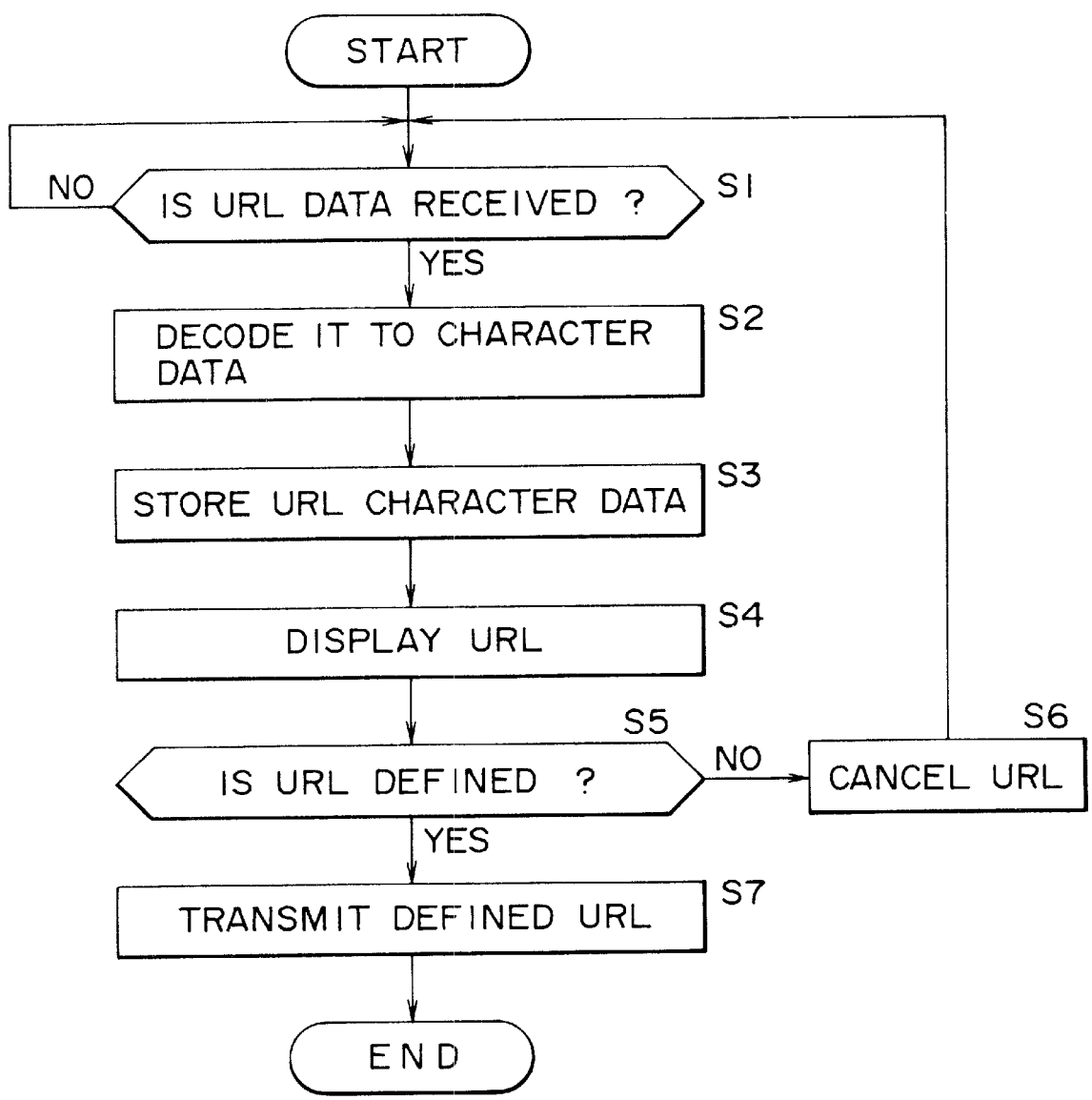
FIG. 3 is a flowchart for explaining the operation of the embodiment shown in FIG. 1.

Next, referring to a flowchart shown in FIG. 3, the flow of operation in the above embodiment to receive a remote control signal, to convert the received remote control signal to the character data of a predetermined character string and to access a terminal provided with the character string as its URL will be described.

First, in step S1, the remote control signal receiving circuit 31 determines whether a remote control signal including a batch of data of a predetermined character string (URL) is received or not, if the remote control signal is not received, the above circuit waits until the remote control signal is received and if the remote control signal is received, the above circuit outputs the received remote control signal to the decoder 32 for remote control.

In step S2, the decoder 32 for remote control decodes the remote control signal to the character data of the corresponding character string and outputs it to the microprocessor 33. The microprocessor 33 stores this character data in the memory 34 in step S3, and in step S4 the microprocessor outputs the character data to the television set 6 via the interface 35 and instructs to display it.

Further, the microprocessor 33 instructs the television set 6 to display an image which prompts input whether the character string (URL) is to be defined or not. For example, the microprocessor instructs the television set 6 to display an image which prompts user input instructing the television set 6 to send a character string "yes" to STB 5 if a character string is to be defined and to send a character string "no" to STB 5 if the input of a character string (URL) is to be canceled.

When the user inputs the character string "yes" or "no" on confirming the displayed image which prompts to define URL, the character data is transmitted to STB 5 as a remote control signal. Upon receiving the remote control signal, the remote control signal receiving circuit 31 outputs the signal to the decoder 32 for remote control.

If the character string "yes" or "no" is to be input via OCR 11 or the bar code reader 12, printer graphics or bar codes corresponding to these character strings "yes" and "no" are prepared beforehand so as to enable reading this character string similar to reading the URL character string described above.

The decoder 32 for remote control decodes a remote control signal to character data and outputs it to the microprocessor 33. The microprocessor 33 determines whether a supplied character code is "yes" or not in step S5 and if the microprocessor determines that the code is not "yes," it deletes the character data (URL) of a predetermined character string which is stored in the memory 34 in step S6, also deletes the predetermined character string (URL) displayed on the television set 6, returns control to step S1 and waits until new URL is input.

If the microprocessor 33 determined that a supplied character code is "yes," it supplies URL corresponding to character data stored in the memory 34 to the modem 36 via the interface 35 in step S7 and instructs the modem to access to an external terminal corresponding to the URL via a telephone line.

As described above, STB 5 receives a remote control signal sent from the remote input unit 1, decodes it to character data corresponding to a predetermined character string and accesses to an external terminal provided with the character string as URL.

Figure 4:
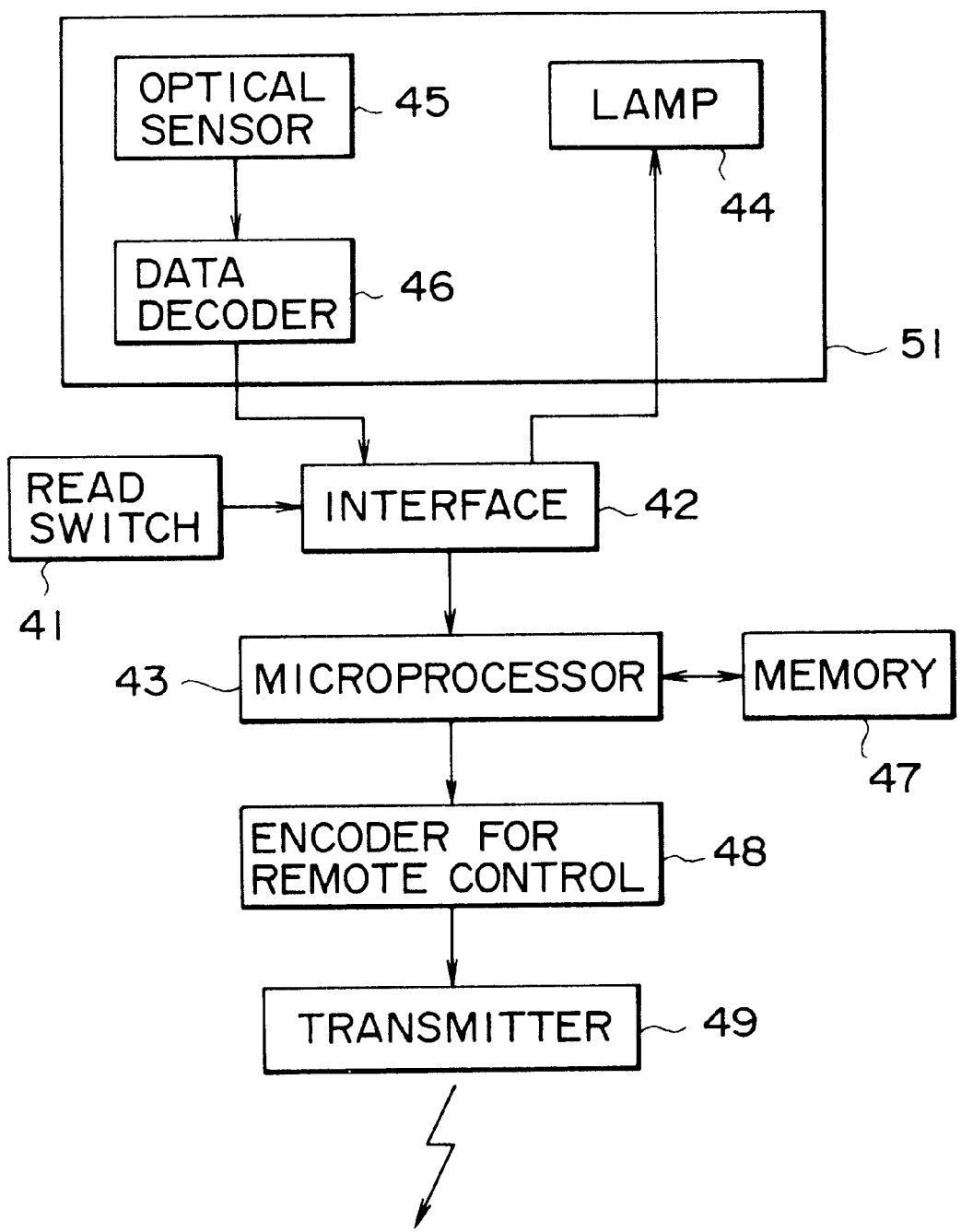
FIG. 4 is a block diagram showing the constitution of the inside of an optical character reader (OCR) shown in FIG. 1.

FIG. 4 shows the constitution of the inside of OCR 11 shown in FIG. 1. In this embodiment, OCR is designed so that a predetermined character string is input by an optical reader 51 (batch input means) constituted by a lamp 44 for irradiating light on a character string in writing, an optical sensor 45 for detecting the reflected light of the irradiated light and a data decoder 46 for decoding the detected signal to the corresponding character data.

A reading switch 41 is turned on by a user when a character string (URL) in writing is read and it is turned off when reading is finished. The reading switch 41 is designed so that it supplies a signal corresponding to its operation to an microprocessor 43 via an interface 42.

The lamp 44 is designed so that it irradiates light on the writing in which a predetermined character string is written according to an instruction by the microprocessor 43, and the optical sensor 45 is designed so that it detects the reflected light of the light irradiated by the lamp 44 and supplies the detected signal to the data decoder 46.

The data decoder 46 is designed so that it decodes a signal supplied by the optical sensor 45 to the corresponding character data and supplies the character data to the microprocessor 43 via the interface 42.

The microprocessor 43 is designed so that it executes a variety of processing, for example instructs the lamp 44 to irradiate light when a signal showing the switch is turned on is supplied from the reading switch 41 via the interface 42. The microprocessor 43 is also designed so that it stores character data supplied by the data decoder 46 in a memory 47 and supplies a batch of character data stored in the memory 47 to an encoder 48 for remote control when a signal showing the switch is turned off is supplied from the reading switch 41.

The encoder 48 for remote control is designed so that it encodes character data supplied by the microprocessor 43 to communication data and outputs it to a sending circuit 49 (sending means). The sending circuit 49 is designed so that it sends communication data supplied by the encoder 48 for remote control to STB 5 as a remote control signal.

Figure 5:
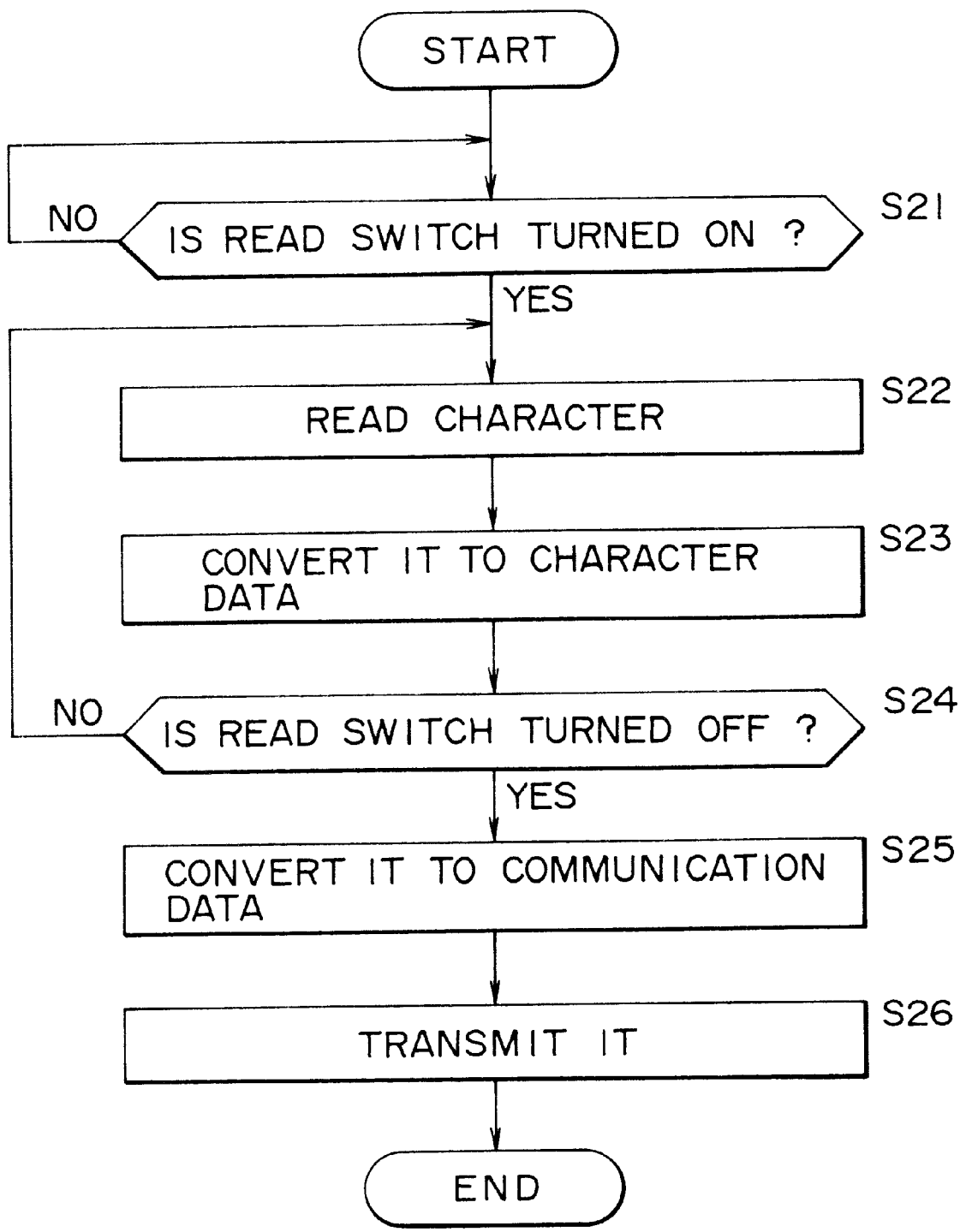
FIG. 5 is a flowchart for explaining the operation of the embodiment shown in FIG. 4.

Next, referring to a flowchart shown in FIG. 5, the operation of the embodiment shown in FIG. 4 will be described.

First, in step S21, the microprocessor 43 determines whether a user has turned on the reading switch 41 or not and if the reading switch 41 is off, the microprocessor waits until the switch is turned on. If the microprocessor 43 determines the reading switch 41 is on, processing proceeds to step S22.

In step S22, the microprocessor 43 instructs the lamp 44 via the interface 42 to irradiate light. When the lamp 44 irradiates light, the optical sensor 45 detects reflected light from writing in which a character string is written and supplies the detected signal to the data decoder 46.

In step S23, the data decoder 46 decodes the supplied signal to the corresponding character data and outputs it to the microprocessor 43. The microprocessor 43 stores the character data in the memory 47.

In step S24, the microprocessor 43 determines whether the reading switch 41 is off or not and if the microprocessor determines the reading switch 41 is on, it returns control to step S22 so as to continue reading a character string.

If the microprocessor 43 determines the reading switch 41 is off, it determines that reading a chain of character strings is finished, reads a batch of character data stored in the memory 47 in step S25 and supplies it to the encoder 48 for remote control.

When character data is supplied, the encoder 48 for remote control encodes the character data to communication data and outputs it to the sending circuit 49. In step S26, the sending circuit 49 sends communication data supplied by the encoder 48 for remote control to STB 5 as a remote control signal.

As describe above, URL in writing is read, is converted to character data, is further converted to communication data and is sent to STB 5 as a remote control signal.

However, the bar code reader 12 shown in FIG. 1 is also constituted substantially similarly to OCR 11 shown in FIG. 4 and the bar code reader is designed so that its data decoder 46 decodes a signal including information shown by a graphic pattern (a bar code) detected by its optical sensor 45 to the corresponding character data and the character data is supplied to its microprocessor 43 via its interface 42. As the operation is substantially similar to the operation in the embodiment of OCR 11, the description is omitted.

Figure 6:
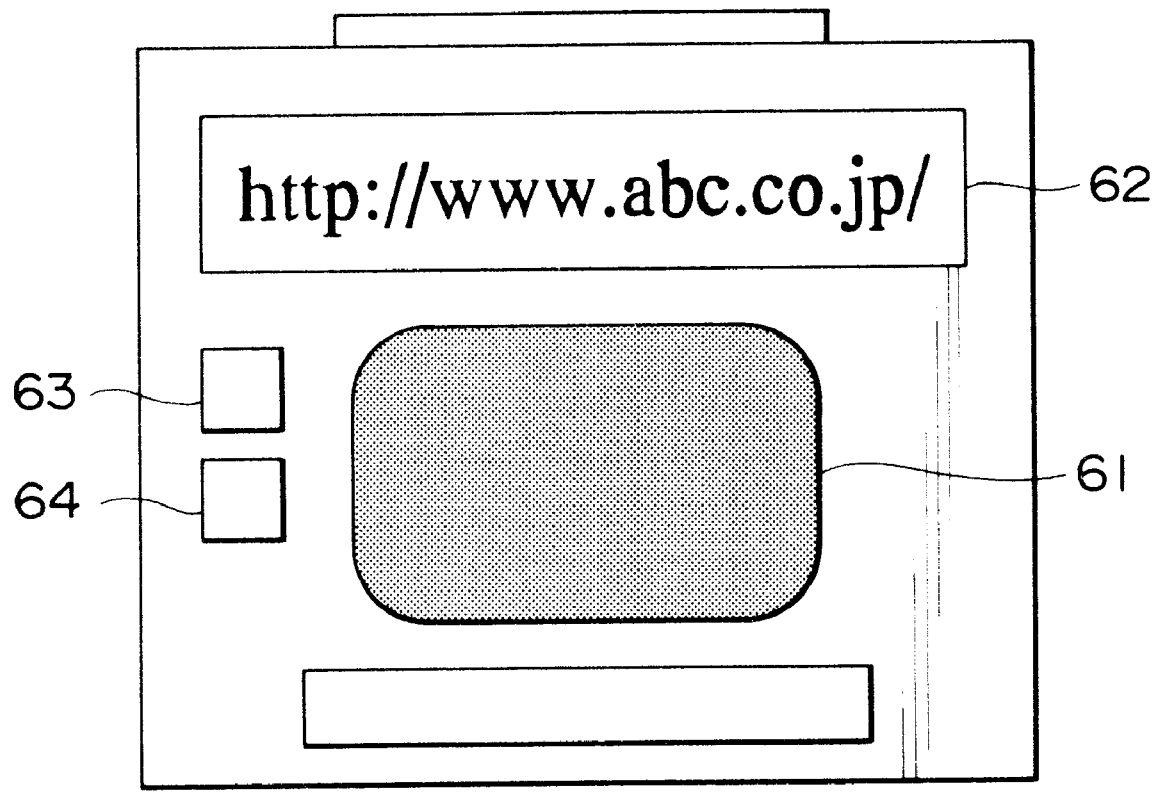
FIG. 6 is a block diagram showing the constitution of the outside of a handwriting input remote controller shown in FIG. 1.

FIG. 6 shows the detailed constitution of the outside of the handwriting input remote controller 13 shown in FIG. 1.

In this embodiment, the handwriting input remote controller is provided with a tablet 61 for sensing pressure applied by a user via a pen or a pencil and outputting handwriting (the locus of points at which the above pressure is sensed) as data, a liquid crystal display (LCD) 62 for displaying a character corresponding to the handwriting, a definition button 63 which is operated when a character displayed on LCD 62 is defined and a cancellation button 64 which is operated when a character displayed on LCD 62 is canceled.

Figure 7:
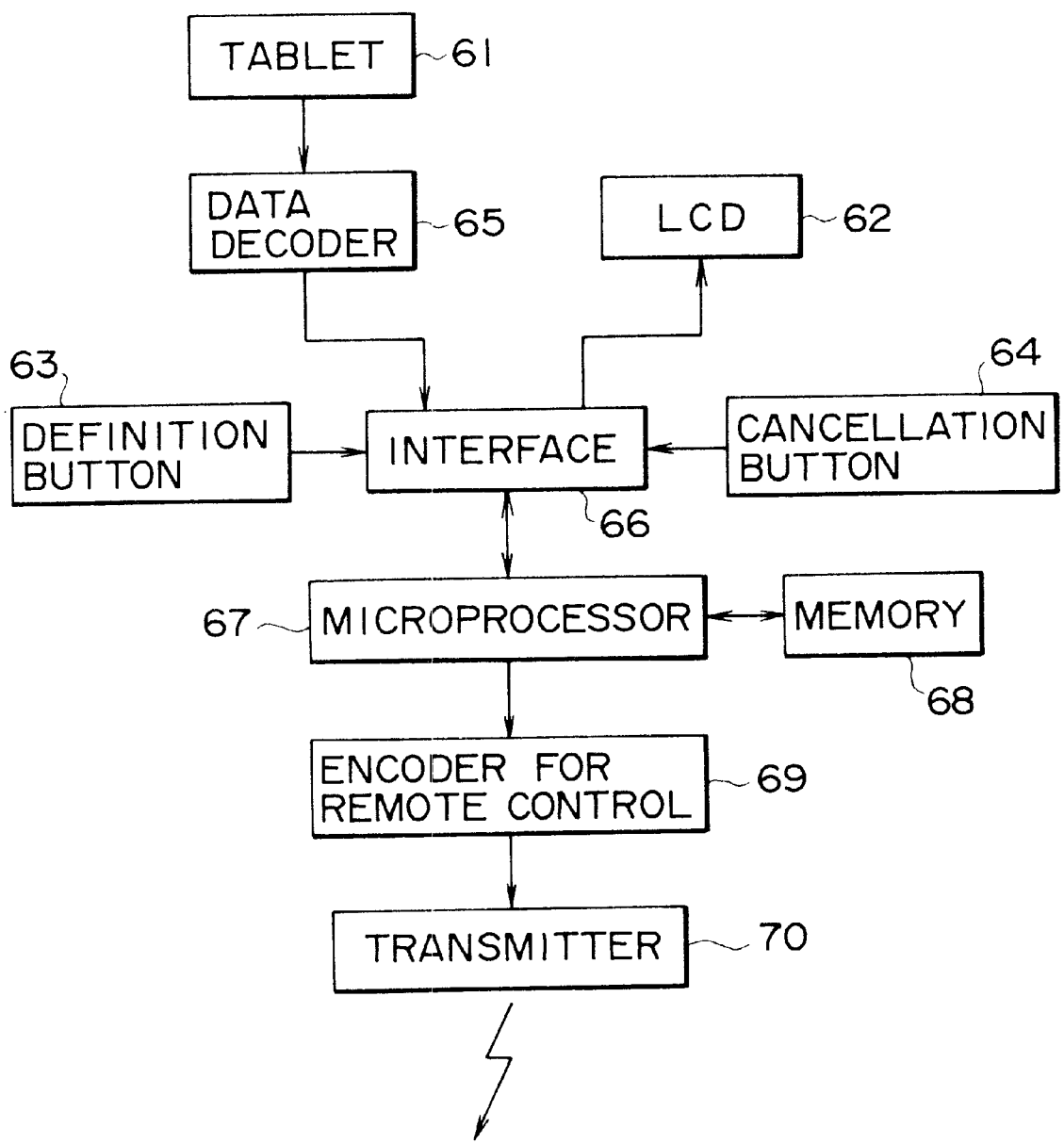
FIG. 7 is a block diagram showing the constitution of the inside of the embodiment shown in FIG. 6.

FIG. 7 shows the constitution of the inside of the embodiment shown in FIG. 6. In this embodiment, the tablet 61 is designed so that it senses pressure when a user writes a letter and outputs the data of the handwriting to a data decoder 65.

The data decoder 65 is designed so that it recognizes a character based upon the data of handwriting supplied by the tablet 61, generates the corresponding character data and outputs it to a microprocessor 67 via an interface 66.

LCD 62 is designed so that it is connected to the microprocessor 67 via the interface 66 and displays a character corresponding to handwriting detected in the tablet 61.

The definition button 63 is designed so that it supplies a signal for defining a character to the microprocessor 67 via the interface 66 when the button is pressed by a user and the cancellation button 64 is designed so that it supplies a signal for canceling input to the microprocessor 67 via the interface 66 when the button is pressed by a user.

The microprocessor 67 is designed so that it executes a variety of processing, for example so that it instructs LCD 62 via the interface 66 to display character data supplied by the data decoder 65. The microprocessor 67 is also designed so that it stores character data supplied by the data decoder 65 in a memory 68 when a signal for defining a character is supplied via the interface 66 by pressing the definition button 63 and deletes character data stored in the memory 68 when a signal for canceling input is supplied by pressing the cancellation button 64.

An encoder 69 for remote control and a sending circuit 70 are provided with the same function as the encoder 48 for remote control and the sending circuit 49 in OCR 11 shown in FIG. 4.

Figure 8:
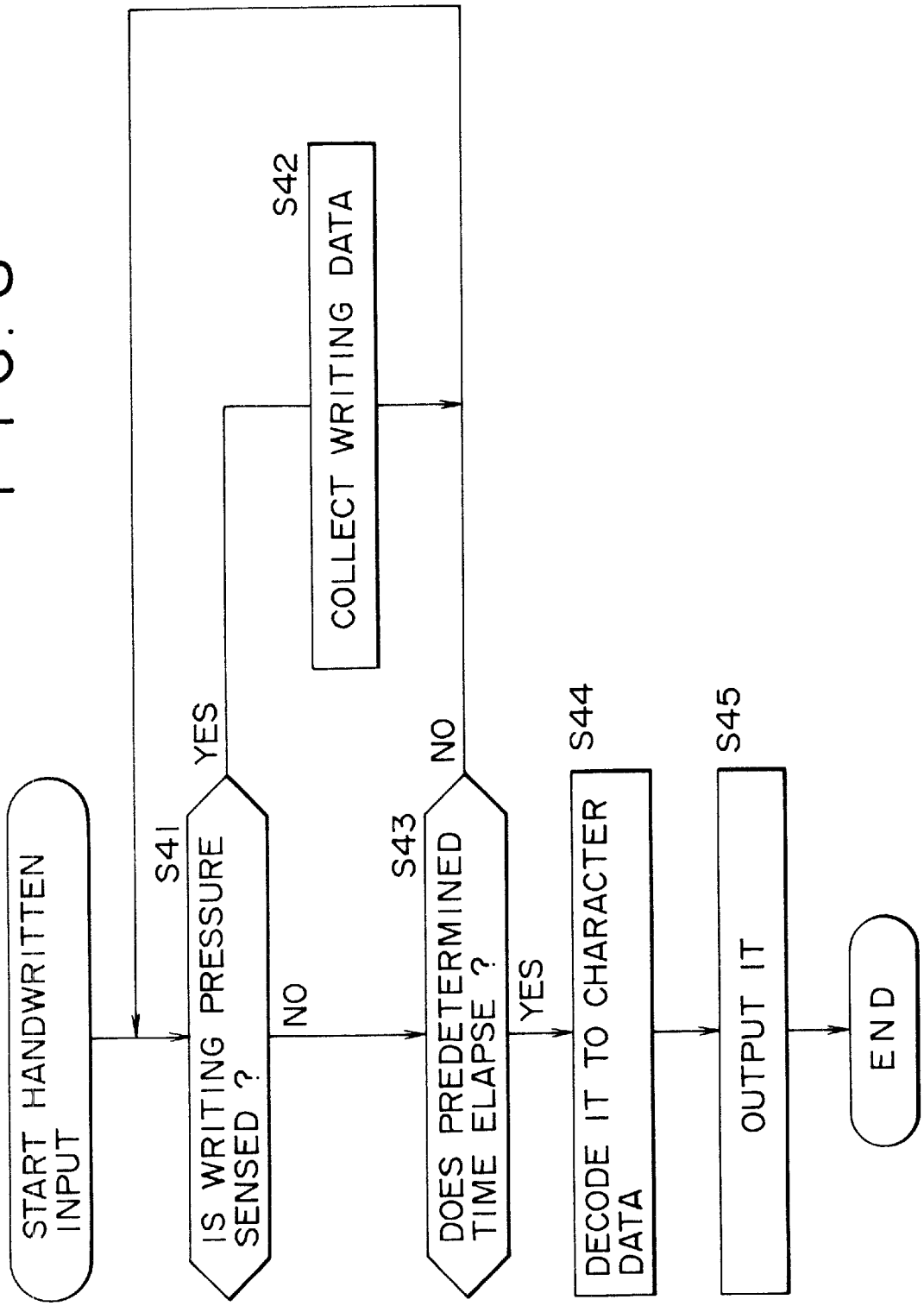
FIG. 8 is a flowchart for explaining the operation for detecting a handwritten letter in the embodiment shown in FIG. 6.

Next, the operation of this embodiment will be described. First, referring to a flowchart shown in FIG. 8, the operation for detecting a handwritten letter by the tablet 61 and the data decoder 65 will be described.

In step S41, the data decoder 65 determines whether the tablet 61 senses pressure applied by a user via a pen or a pencil or not and if the data decoder determines the tablet senses it, the data of handwriting is stored in step S42.

If the data decoder 65 determines the tablet 61 senses no pressure, processing proceeds to step S43, the data decoder determines whether time in which no pressure is sensed continues longer than predetermined time or not, if the time does not continue longer than predetermined time, control is returned to step S41 and if the time continues longer than predetermined time, processing proceeds to step S44.

If the time in which no pressure is sensed continues longer than predetermined time, input for one character is regarded as finished at that time, and in step S44, the data decoder 65 recognizes the stored data of handwriting as a character, converts it to the corresponding character data and outputs it to the microprocessor 67 via the interface 66 in step S45.

As described above, the data decoder 65 converts the data of handwriting detected by the tablet 61 to character data and outputs the converted character data to the microprocessor 67 via the interface 66.

Figure 9:
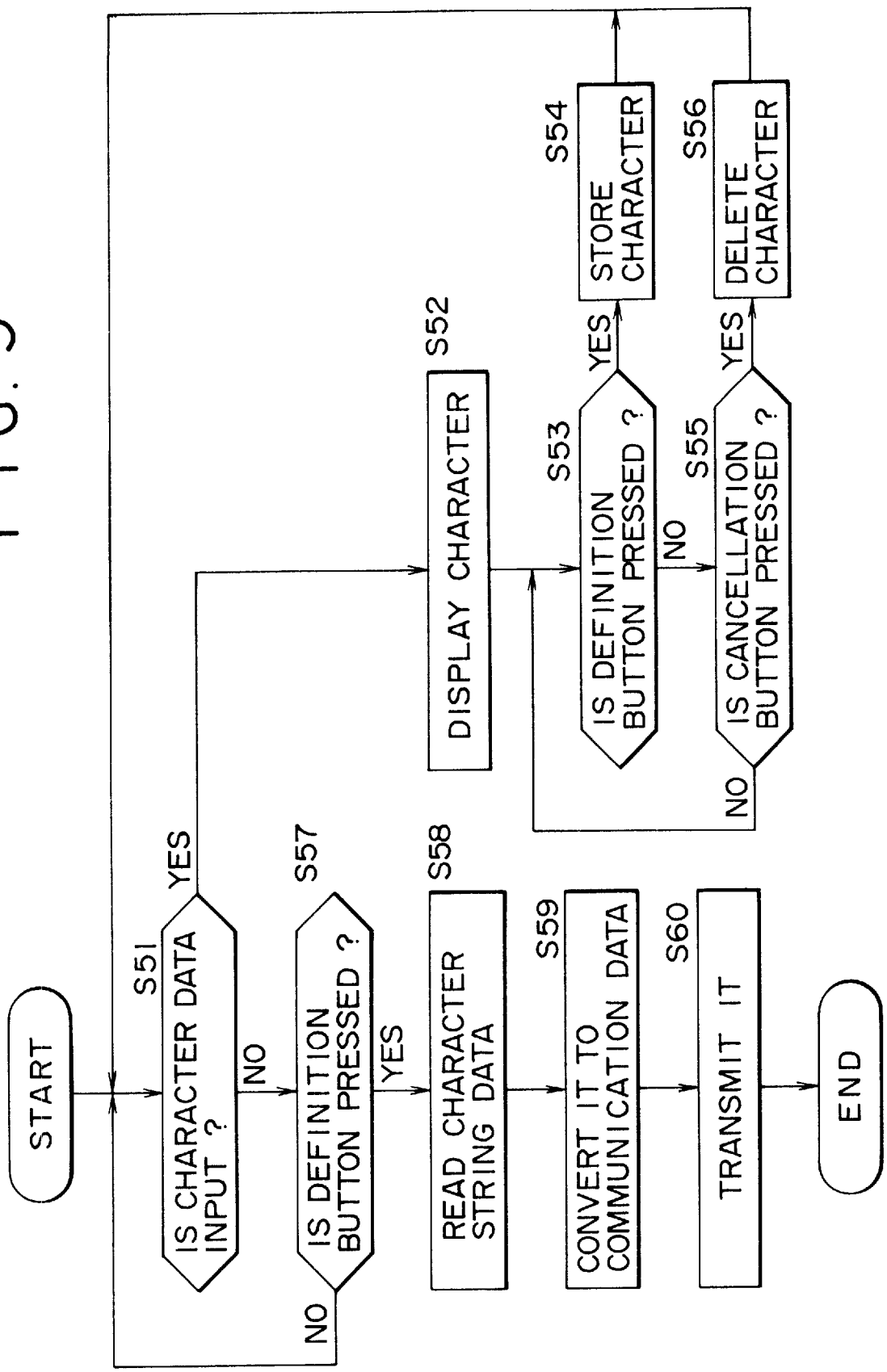
FIG. 9 is a flowchart for explaining the operation for processing character data in the embodiment shown in FIG. 6.

Next, referring to a flowchart shown in FIG. 9, the operation for processing character data supplied by the data decoder 65 will be described.

The microprocessor 67 determines whether character data is supplied by the data decoder 65 via the interface 66 or not in step S51, and if character data is supplied, processing proceeds to step S52 and the microprocessor instructs LCD 62 to display the character on LCD 62 via the interface 66.

After the character is displayed on LCD 62, the microprocessor 67 determines whether the definition button 63 is pressed or not in step S53 and if the microprocessor determines the definition button is pressed, control is returned to step S51 after the character data is stored in the memory 68 in step S54.

In the meantime, in step S55, the microprocessor 67 determines whether the cancellation button 64 is pressed or not, and if the microprocessor determines the cancellation button is pressed, the character data stored in the memory 68 is deleted in step S56 and control is returned to step S51 after the character displayed on LCD 62 is also deleted.

If neither the definition button 63 nor the cancellation button 64 are pressed, the microprocessor 67 waits until either the definition button 63 or the cancellation button 64 is pressed.

As described above, a character input by handwriting is displayed and processing for defining or canceling the character is performed.

Next, when the microprocessor 67 determines character data is not supplied by the data decoder 65 in step S51, it determines whether the definition button 63 is pressed or not in step S57, and if the microprocessor determines the button is pressed, it regards the input of a character string as finished, reads a batch of character data corresponding to the character string from the memory 68 in step S58 and outputs it to the encoder 69 for remote control.

In step S59, the encoder 69 for remote control encodes the character data to communication data, outputs it to the sending circuit 70 and in step S60, the sending circuit 70 sends communication data supplied by the encoder 69 for remote control to STB 5 as a remote control signal.

As described above, handwriting is detected, a character string (URL) is input by converting the handwriting to character data, character data corresponding the character string is converted to communication data and is sent to STB 5 as a remote control signal.

Figure 10:
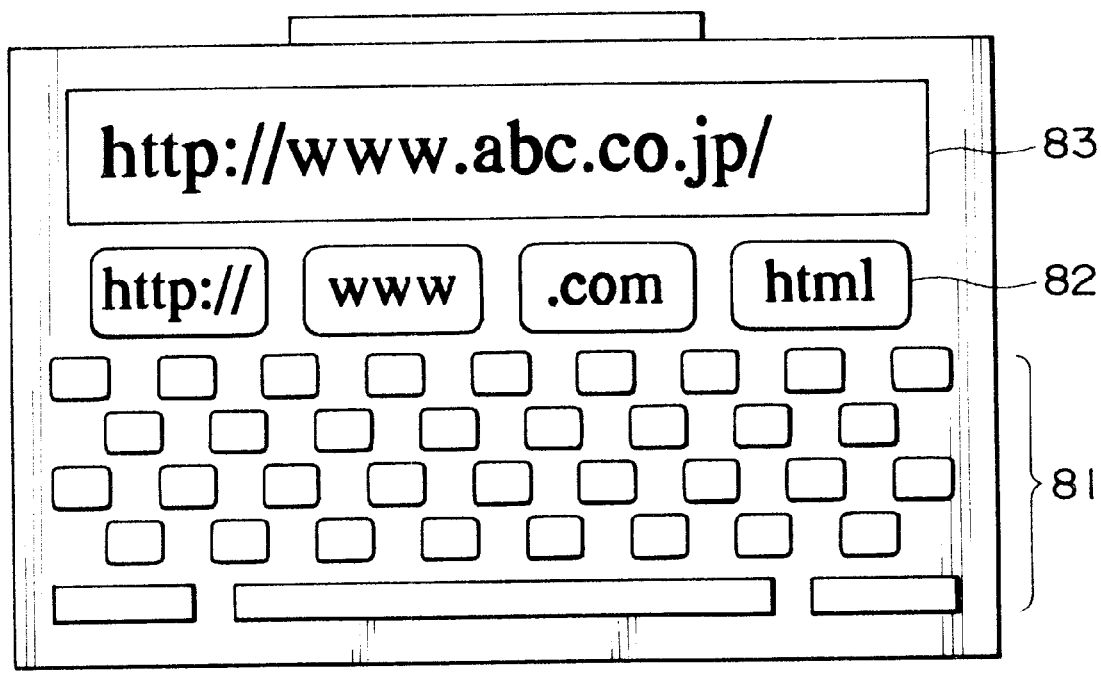
FIG. 10 shows the constitution of the outside of a keyboard input remote controller shown in FIG. 1.

FIG. 10 shows the constitution of the detailed outside of the keyboard input remote controller 14 shown in FIG. 1.

In this embodiment, the keyboard input remote controller is provided with a keyboard 81 (input means) which is operated when a predetermined character string is input, a word button 82 (word inputting means) in which a predetermined character string is registered and LCD 83 (display means) for displaying an input character.

Figure 11:
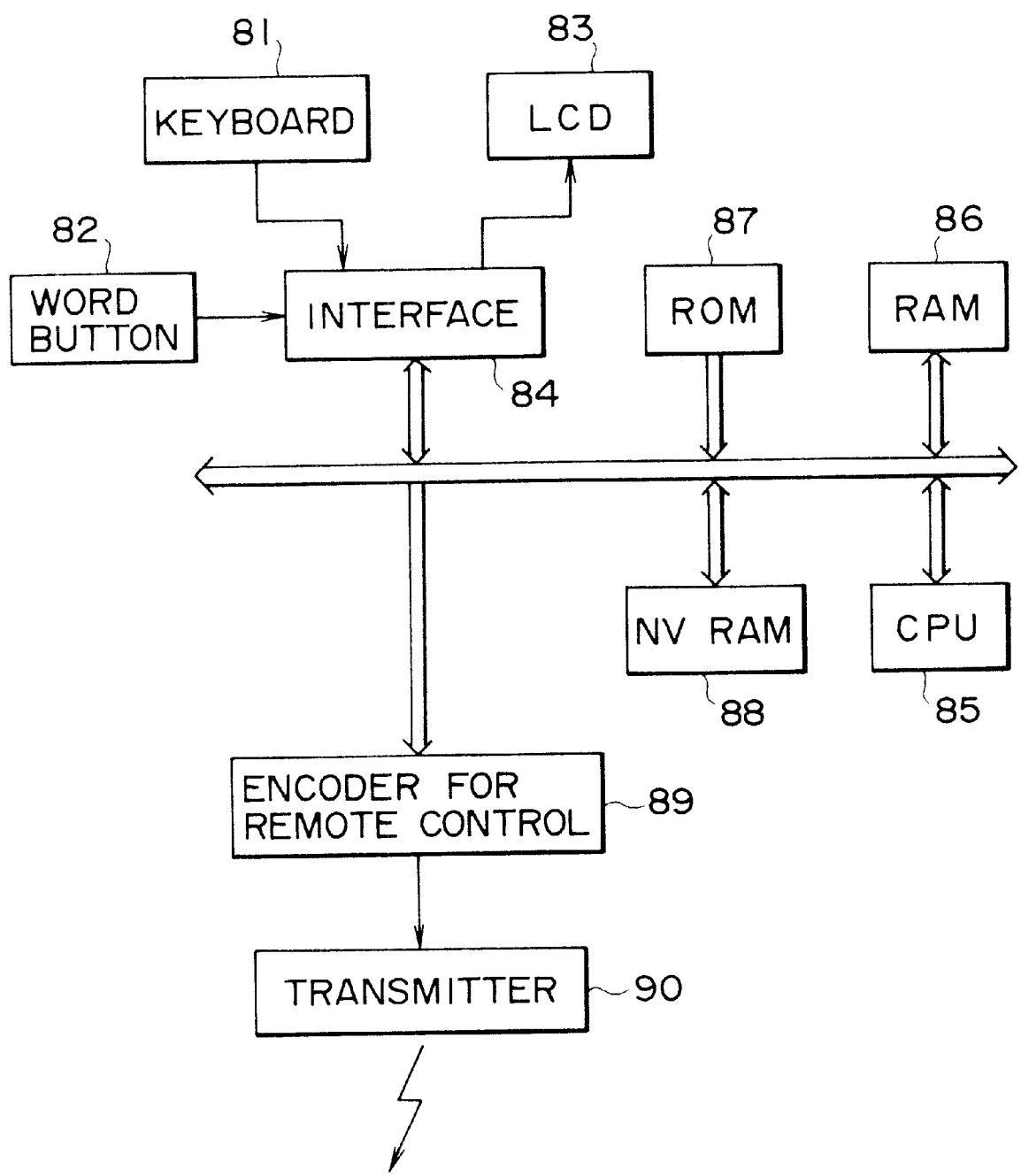
FIG. 11 is a block diagram showing the constitution of the embodiment shown in FIG. 10.

FIG. 11 shows the constitution of the inside of the embodiment shown in FIG. 10. In this embodiment, the keyboard 81 provided with a variety of keys such as a letter key, a delete key and a return key is operated when a predetermined character string is input and the keyboard is designed so that it outputs the character data of the input character string to CPU 85 via an interface 84.

LCD 83 is connected to CPU 85 via the interface 84 and is designed so that it displays a character input by operating the keyboard 81 or the word button 82.

The word button 82 corresponds to a predetermined character string and is designed so that when these buttons are pressed, a signal corresponding to the operation is supplied to CPU 85 via the interface 84. In this embodiment, four word buttons are provided and as shown in FIG. 10, they correspond to the character strings (words) of "http://," "www," ".com" and "html." These words are often used as the character strings of a part of URL.

CPU 85 is designed so that it executes a variety of processing according to a program stored in ROM 87, for example it stores character data supplied from the keyboard 81 in RAM 86 and instructs LCD 83 to display it via the interface 84. RAM 86 is designed so that it temporarily stores data while CPU 85 is performing processing. Non-volatile RAM (NVRAM) 88 is designed so that it also holds stored data such as the character data of a character string corresponding to the word button 82 after the unit is powered off.

CPU 85 is designed so that it reads the character data of a character string corresponding to a word button from NVRAM 88 when a signal is supplied from the word button 82 and outputs the character data to LCD 83 via the interface 84 after CPU 85 stores the character data in RAM 86.

A user can change a character string corresponding to each word button 82 and when a new character string is set, character data corresponding to the character string is stored in NVRAM 88.

An encoder 89 for remote control and a sending circuit 90 are provided with the same function as the encoder 48 for remote control and the sending circuit 49 of OCR 11 shown in FIG. 4, and the encoder 69 for remote control and the sending circuit 70 of the handwriting input remote controller 13 shown in FIG. 7.

Figure 12:
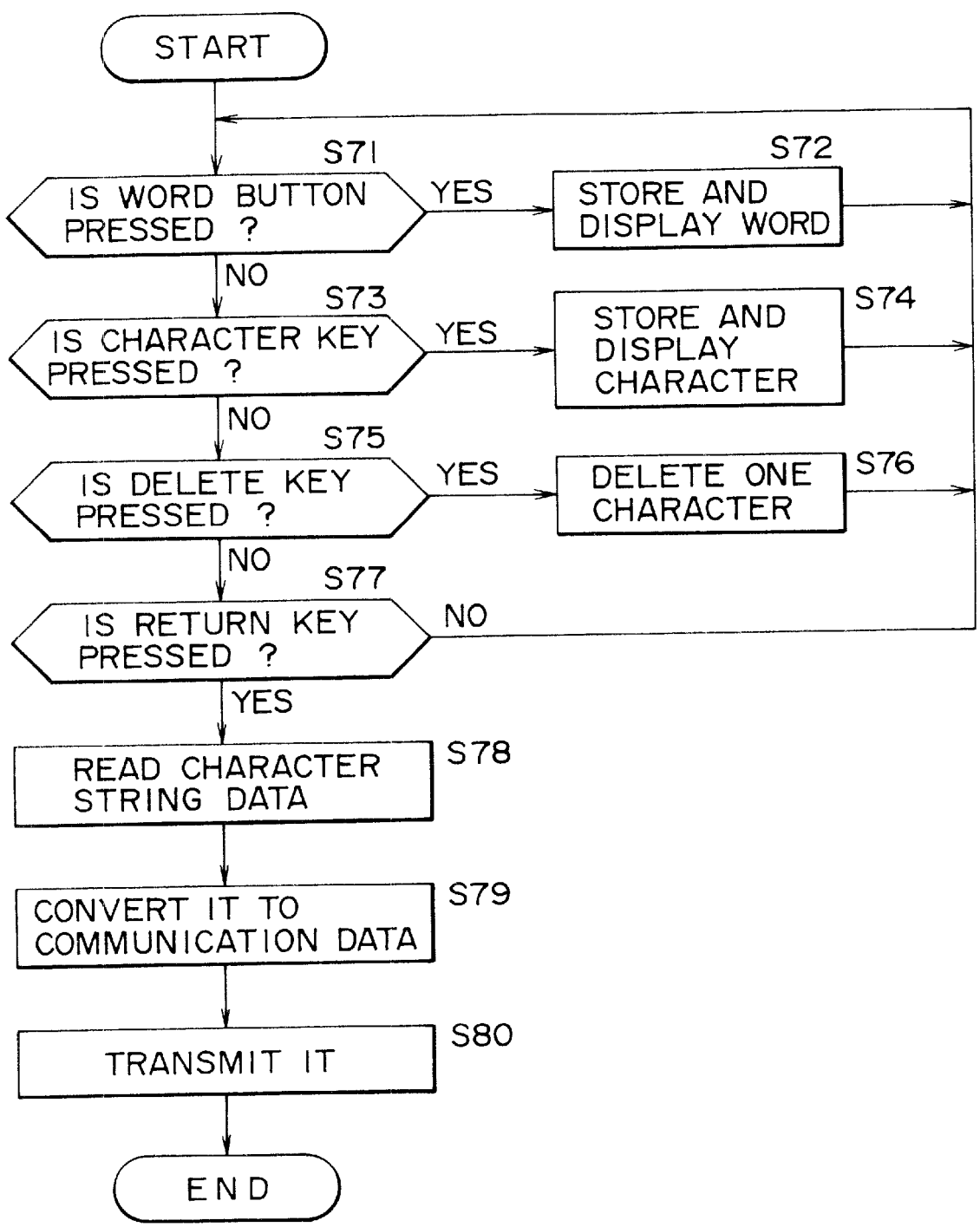
FIG. 12 is a flowchart for explaining the operation in the embodiment shown in FIG. 10.

Next, referring to a flowchart shown in FIG. 12, the operation of this embodiment will be described.

In step S71, CPU 85 determines whether a signal is supplied from the word button 82 via the interface 84 or not, and if a signal is supplied from the word button 82, CPU reads the character data of a character string corresponding to the word button 82 from NVRAM 88 and outputs the character data to LCD 83 via the interface 84 so as to display it on LCD after CPU stores it in RAM 86 in step S72.

In step S73, CPU 85 determines whether a letter key (alphabet, a numeric character and a symbol) is operated and character data is supplied from the keyboard 81 via the interface 84 or not, and if CPU determines character data is supplied, it outputs the character data to LCD 83 via the interface 84 after CPU stores the character data in RAM 86 and instructs LCD to display the character data in step S74.

In the meantime, in step S75, CPU 85 determines whether a delete key is operated from the keyboard 81 via the interface 84 and the corresponding signal is supplied or not, and if CPU determines the signal is supplied, the last character data stored in RAM 86 is deleted by one character and the last character displayed on LCD 83 is deleted in step S76.

In step S77, CPU 85 determines whether a return key of the keyboard 81 is pressed or not, if CPU determines the key is not pressed, control is returned to step S71 so as to continue the input of a character and if CPU determines the return key is pressed, processing proceeds to step S78.

If no word button 82, no character key, a delete key or a return key on the keyboard 81 is not operated, CPU waits until the word button 82 or any of the above keys is operated in steps S71, S73, S75 and S77.

When the return key is pressed and the input of a character string is finished, CPU 85 reads character data corresponding to the input character string from RAM 86 and outputs it to the encoder 89 for remote control in step S78, and in step S79, the encoder 89 for remote control encodes the character data to communication data and outputs it to the sending circuit 90.

In step S80, the sending circuit 90 sends communication data supplied by the encoder 89 for remote control to STB 5 as a remote control signal.

As described above, character data corresponding to a character string (URL) input by operating the keyboard 81 or the word button 82 is sent to STB as a remote control signal.

For example, to input URL "http://www.abc.co.jp/NMM/soukan.html," a word button "http://" and a word button "www" are operated, each letter in ".abc.co.jp/NMM/soukan." is input one by one and finally, a word button "html" has only to be operated. Therefore, URL can be simply and securely input.

A user does not have to see the television set 6 connected to STB 5 when he/she inputs a character string by utilizing the remote input unit 1 shown in FIG. 6 or FIG. 10 and he/she can also readily input a character string in a location far from STB 5.

Figure 13:
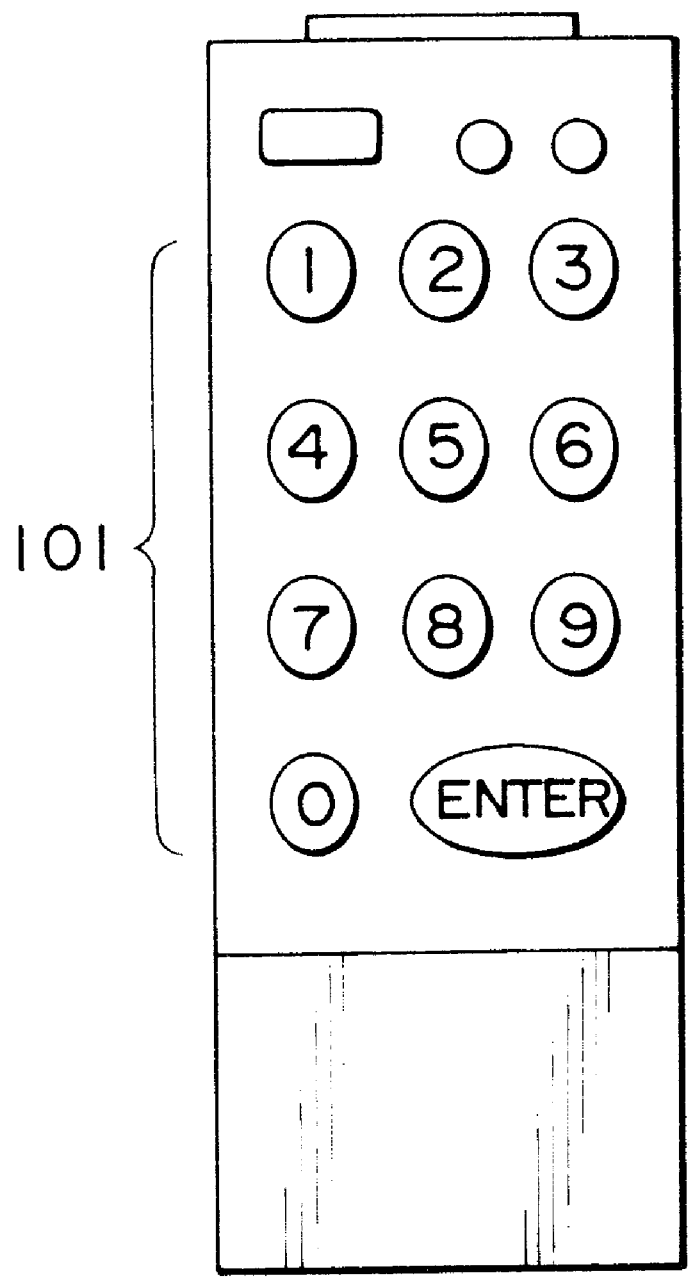
FIG. 13 shows the constitution of a remote controller provided with numeric keys.
Figure 14:
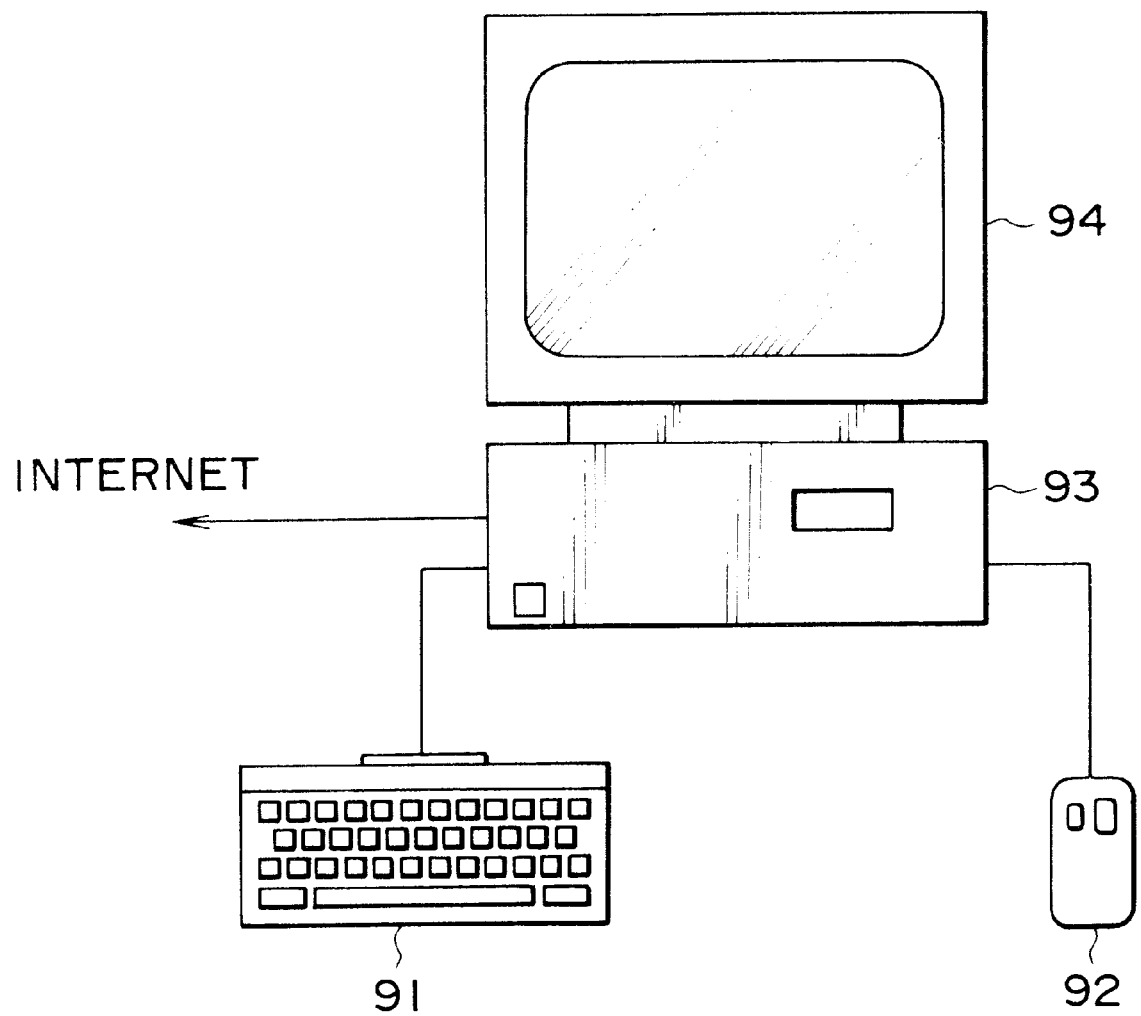
FIG. 14 shows an example of a terminal constituted by a computer.
Figure 16:
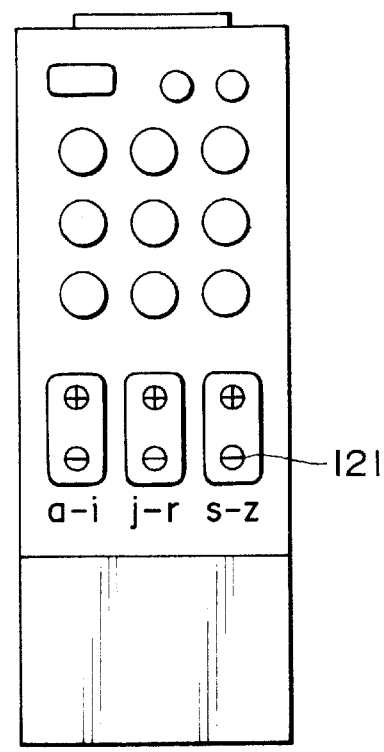
FIG. 16 shows an example of a conventional remote controller.
Figure 17:
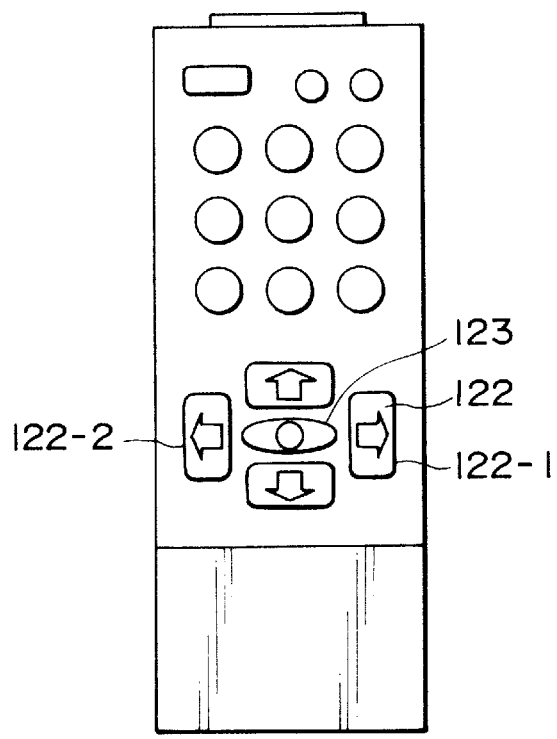
FIG. 17 shows another example of the conventional remote controller.
Figure 18:
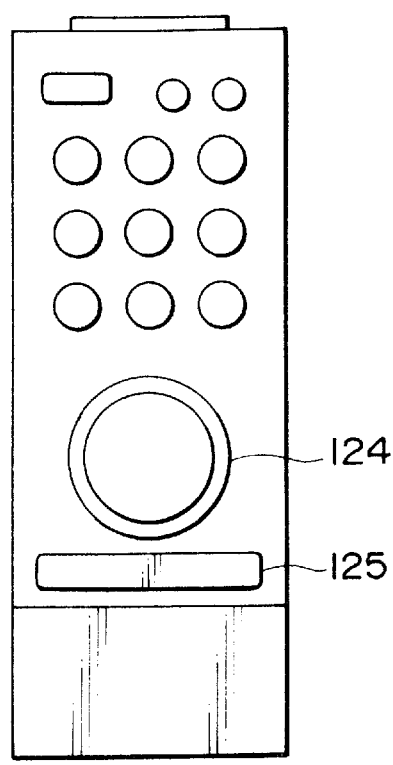
FIG. 18 shows an other example of the conventional remote controller.
Figure 19:
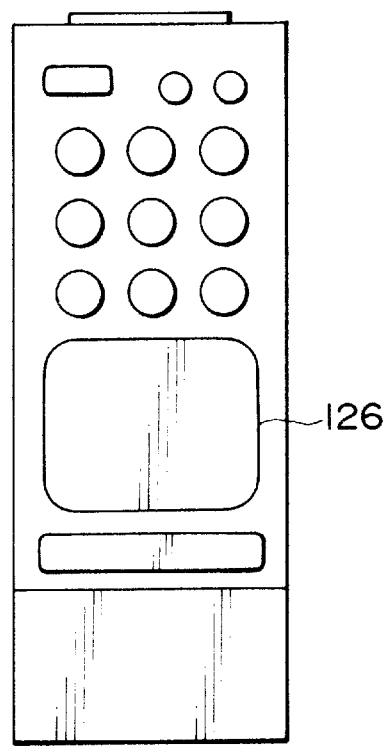
FIG. 19 shows a further other example of the conventional remote controller.
Figure 20:
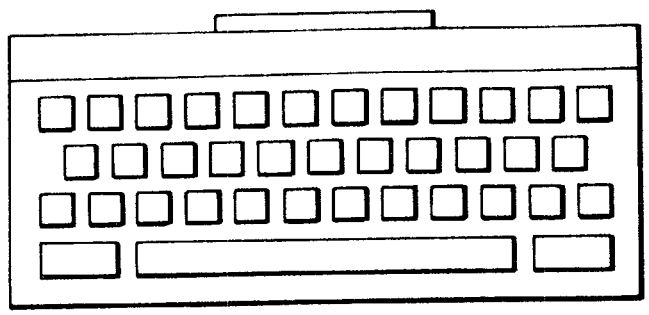
FIG. 20 shows an example of a conventional wireless keyboard.
Figure 21:
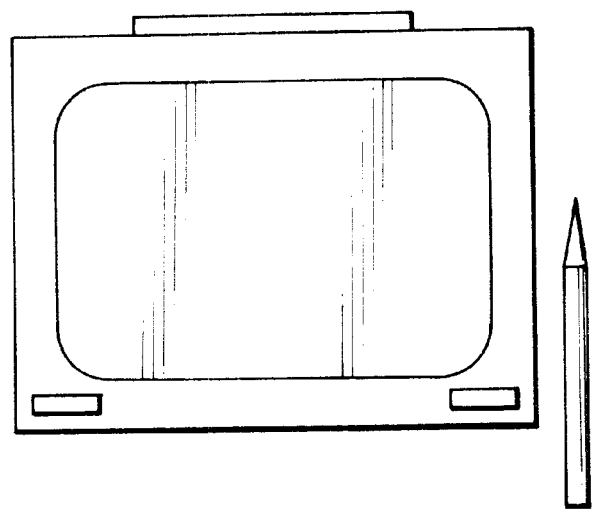
FIG. 21 shows an example of a conventional wireless tablet.

If an input address is IP address which is constituted, for example by only numeric characters and dots, an address can also be input to STB 5 via a relatively simple remote controller shown in FIG. 13 provided with numeric keys 101. In this case, for example a dedicated key for inputting a dot may be also provided, however, another key can also function as the dedicated key.

A domain name or an address which is constituted by such numeric characters can be also input via the above remote input unit 1.

In the above description, STB 5 is separated from the television set 6, however, it may be integrated with the television set. The television set 6 may be also constituted as a monitor in which a tuner is not built. Further, it is natural that an input character string may be also one other than URL.

In the above embodiments, communication is performed with a terminal which is connected to the Internet, however, communication may be also performed with a terminal which is connected to a computer network other than the Internet.

What is claimed is:

1. An information display control unit for controlling information to be displayed on a display, comprising:

receiving means for receiving a batch of remote control signals including communication data of characters forming a character string corresponding to an address of a terminal in a computer network;

conversion means for converting said communication data to said character string and outputting said character string to said display for displaying said character string;

communication means for communicating via said computer network with said terminal having said address corresponding to said character string and which is connected to said computer network; and control means for controlling said communication means to communicate with said terminal having said address corresponding to said character string converted by said conversion means.

2. An information display control method comprising the steps of:

receiving a batch of remote control signals including communication data of characters forming a character string corresponding to an address of a terminal in a computer network;

converting said communication data to said character string and displaying said character string on a display; and communicating via said computer network with said terminal having said address corresponding to said character string and which is connected to said computer network.

3. A remote input unit, comprising:

input means operated by a user for inputting a character string corresponding to an address of a terminal in a computer network;

display means located on the remote input unit for indicating said character string input by said input means; and transmitting means for transmitting communication data corresponding to said character string.

4. The remote input unit as defined in claim 3 further comprising word input means for specifying a predetermined word formed as a character string by one corresponding user operation of the remote input unit.

5. The remote input unit as defined in claim 3, wherein said input means includes means for detecting handwriting and means for generating a character string corresponding to said detected handwriting.

6. A remote input method for use with a computer network, comprising the steps of:
  generating a character string corresponding to an address of a terminal in the computer network by an input operation with a hand-held, wireless remote controller;
  indicating said character string on a display located on said remote controller for confirmation by a user; and
  transmitting communication data corresponding to said character string upon a successful confirmation by the user.

7. A remote input unit, comprising:
  batch input means including character data generation means, said batch input means being user operated to trigger operation of said character data generation means for generating character data of a character string by one single corresponding user operation of said batch input means; and
  transmitting means for transmitting communication data derived from said character data of said character string generated according to said one single corresponding user input operation.

8. The remote input unit as defined in claim 7, wherein said batch input means includes means for reading at least one of said character string and a graphic pattern corresponding to said character string optically by said one single corresponding user operation.

9. A remote input method comprising the steps of:
  generating character data of a character string by one single corresponding user input operation; and
  transmitting communication data derived from said character data corresponding to said character string generated according to said one single corresponding user input operation.

* * * * *